No. 795,060. PATENTED JULY 18, 1905.
G. W. PAYNE.
TRUNK OR BAGGAGE LIFTER AND CARRIER.
APPLICATION FILED JAN. 23, 1905.
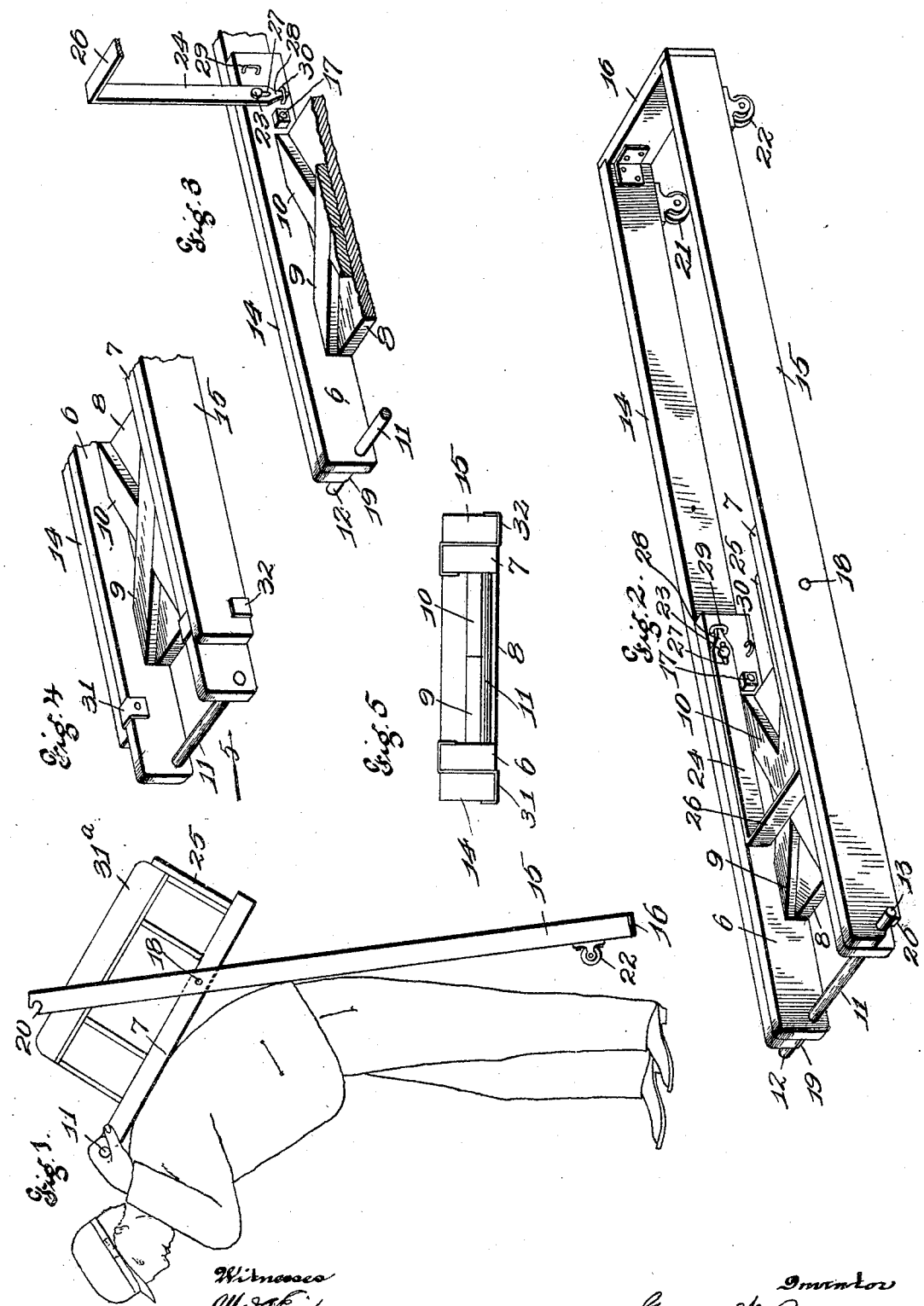
Witnesses
Alfred Eirks
Edw. M. Harrington
Inventor
George W. Payne
By Higdon Longan & Hopkins Attys No. 795,060. Patented July 18, 1905.

UNITED STATES PATENT OFFICE.

GEORGE W. PAYNE, OF ST. LOUIS, MISSOURI.

TRUNK OR BAGGAGE LIFTER AND CARRIER.

SPECIFICATION forming part of Letters Patent No. 795,060, dated July 18, 1905.

Application filed January 23, 1905. Serial No. 242,302.

*To all whom it may concern:*

Be it known that I, GEORGE W. PAYNE, a citizen of the United States, and a resident of St. Louis, Missouri, have invented certain new and useful Improvements in Trunk or Baggage Lifters and Carriers, of which the following is a specification containing a full, clear, and exact description, reference being had to the accompanying drawings, forming a part hereof.

My invention relates to the improvements in trunk-carriers; and it consists of the novel features herein shown, described, and claimed.

In the drawings, Figure 1 is a side elevation illustrating the operation of a trunk-carrier embodying the principles of my invention. Fig. 2 is a perspective showing the trunk-carrier folded. Fig. 3 is a perspective detail, parts being broken away to economize space and other parts being shown in section to illustrate the construction. Fig. 4 is a view analogous to Fig. 2 and showing the modified construction, parts being broken away to economize space. Fig. 5 is an end elevation of the parts shown in Fig. 4 as seen looking in the direction indicated by the arrow 5 in Fig. 4.

Referring to the drawings in detail, the side pieces 6 and 7 are secured to the side edges of the back-plate 8, and braces 9 and 10 are inserted between the side pieces 6 and 7 upon the plate 8, so as to hold the side pieces 6 and 7 perfectly rigid and so as to bring the lower edges of the plate 8 flush with the lower edges of the side pieces 6 and 7. The hand-bar 11 is rigidly mounted through the upper ends of the side pieces 6 and 7, the ends of said hand-bar projecting outwardly beyond said side pieces to form the stops 12 and 13. Pivoted side pieces 14 and 15 are pivoted to the side pieces 6 and 7 near their lower ends by bolts 17 and 18. Notches 19 and 20 are cut in the lower edges and upper ends of the side pieces 14 and 15 to receive the stops 12 and 13, so as to allow the side pieces 14 and 15 to lie level with the side pieces 6 and 7. Rollers 21 and 22 are attached to the lower edges and lower ends of the side pieces 14 and 15. A pin 23 is fixed in the inner face and near the lower end of the side piece 6, and a similar pin (not shown) is fixed in the inner face and near the lower end of the side and the cross-piece 26, there being an elongated slot 27 through the lower end of the side piece 24 and a similar slot through the lower end of the side piece 25 in the slots 27, the heads of the pins being inside of the side pieces to hold the side pieces in position. Points 28 are formed upon the extreme lower ends of the side pieces 24 and 25, said points engaging in staples 29 to hold the frame in its horizontal folded position, as in Fig. 2, and said points engaging in the staples 30 to hold the side pieces in their vertical positions, as in Fig. 3.

When the carrier is in its folded position, as in Fig. 2, it may be used as a hand-truck. The operator grasps the hand-bar 11 and raises that end of the device, and the opposite end rests upon the rollers 21 and 22. When it is desired to handle a trunk, the bars 24 and 25 are raised to the vertical position, as shown in Fig. 3, and the trunk placed upon the side pieces 6 and 7. When it is desired to carry up or down stairs or any place that a hand-truck cannot be operated, the operator will raise the device to a substantially vertical position and place the plate 8 upon his back, as shown in Fig. 1, then the side pieces 14 and 15 will swing downwardly to a vertical position, and the upper ends will swing upwardly, one upon each side of the trunk 31ª, and hold the trunk in position. When it is desired to lower the trunk, the lower ends of the side bars 14 and 15 are lowered to rest upon the floor or ground, and then the hand-bar is lowered.

In the modification shown in Figs. 4 and 5 the side bars 14 and 15 are cut short, and Z-shaped hooks 31 and 32 are secured to the side pieces 6 and 7 and extend downwardly and outwardly to form stops and limit the swing of the upper ends of the side pieces 14 and 15.

I claim—

1. In a trunk-carrier: a backboard; side pieces secured to the backboard; a hand-bar secured to the upper ends of the side pieces; and supporting-bars pivoted to the lower ends of side pieces.

2. In a trunk-carrier: a backboard; side pieces secured to the backboard; a hand-bar secured to the upper ends of the side pieces; supporting-bars pivoted to the lower ends of the side pieces; and rollers carried by the lower ends of the supporting-bars.

3. In a trunk-carrier: a frame having a hand-bar at its upper end; supporting-bars pivoted to the frame; and trunk stop-bars connected to the frame.

In testimony whereof I have signed my name to this specification in presence of two subscribing witnesses.

GEORGE W. PAYNE.

Witnesses:
    ALFRED A. EICKS,
    JOHN C. HIGDON.